United States Patent
Kitani et al.

(10) Patent No.: US 6,257,625 B1
(45) Date of Patent: Jul. 10, 2001

(54) FLEXIBLE JOINT AND LONG NUT FOR FLEXIBLE JOINT

(75) Inventors: Kenji Kitani; Masaru Kitamura; Yasushi Fujita, all of Osaka (JP)

(73) Assignee: Taisei Kiko Co., Ltd., Osaka (JP)

( * ) Notice: Subject to any disclaimer, the term of this patent is extended or adjusted under 35 U.S.C. 154(b) by 0 days.

(21) Appl. No.: 09/298,289

(22) Filed: Apr. 23, 1999

(51) Int. Cl.[7] .................................................. F16L 27/12

(52) U.S. Cl. ........................ 285/2; 285/4; 285/145.3; 411/5

(58) Field of Search ......................... 403/2; 285/145.3, 285/1, 2, 3, 4; 411/3, 5, 389

(56) References Cited

U.S. PATENT DOCUMENTS

| | | | |
|---|---|---|---|
| 2,249,848 | * | 7/1941 | O'Brien ..................... 285/2 |
| 3,002,775 | * | 10/1961 | Mueller et al. ................ 402/2 |
| 4,351,351 | * | 9/1982 | Flory et al. ................. 285/2 |
| 4,923,319 | * | 5/1990 | Dent ........................ 403/2 |
| 5,161,828 | * | 11/1992 | Hynes ....................... 285/2 |
| 5,474,408 | * | 12/1995 | Dinitz et al. ................ 411/5 |
| 6,056,329 | * | 5/2000 | Kitani et al. .............. 285/145.3 |
| 6,056,471 | * | 5/2000 | Dinitz ...................... 411/5 |

FOREIGN PATENT DOCUMENTS

| | | | |
|---|---|---|---|
| 2467312 | * | 5/1981 | (FR) ........................ 411/5 |
| 8-121665 | | 5/1996 | (JP) . |

* cited by examiner

*Primary Examiner*—Eric K. Nicholson
(74) *Attorney, Agent, or Firm*—Knobbe, Martens, Olson & Bear, LLP

(57) ABSTRACT

A flexible joint comprises: first cylindrical bodies comprising a pair of spherical ring members; a second cylindrical body comprising a sleeve relatively movably inserted in the first cylindrical bodies from an axial direction X of the second cylindrical body; third cylindrical bodies comprising a pair of casing tubes which are fitted around outer peripheral surfaces of the first cylindrical bodies and are provided with mutually slidable spherical inner peripheral surfaces, the casings being formed at their opposite ends with connecting portions, and being provided at their outer peripheral surfaces of large diameter portions with projections having through holes; and rods capable of being inserted into the through holes formed in the outer peripheral surfaces of the large diameter portions, each of the rods being provided and fixed between the projections of the pair of third cylindrical bodies for restricting the telescopic movement of the tube joint, wherein the rods comprise a pair of rods connected to each other in the vicinity of a substantially central portion between the opposed projections, the pair of rods being threadedly connected to at least one of bottomed holes opened and formed on opposite ends of a long nut which is provided at its substantially central portion with a notched portion so that when excessive external force is applied, the notched portion is preferentially broken to restore telescopic flexible effect of the tube joint.

6 Claims, 4 Drawing Sheets

FLEXIBLE JOINT AND LONG NUT FOR FLEXIBLE JOINT

BACKGROUND OF THE INVENTION

1. Field of the Invention

The present invention relates to a flexible joint and a long nut for flexible joint, and more particularly, to a telescopic flexible tube joint which is used for connecting a water pipe and is capable of absorbing external force even if excessive external force is applied and thus, is capable of preventing the tube from being destroyed, and is easily handled, and to a long nut used for such a telescopic flexible tube joint.

2. Description of the Related Art

Tubes such as long water pipes laid on or under the ground are subjected, in some cases, to various external force such as compression force and tensile force in a direction of the core of the tube shaft due to ground subsidence or earthquake, and shearing force and bending moment. If such external force is too great, stress is concentrated on a tube joint which connects the tubes, and the tube joint is destroyed. Thereupon, it is necessary to absorb the external force applied to the water pipe portion to prevent the tube joint from being damaged.

Conventionally, in order to absorb the external force to prevent the destruction, there has been developed a tube joint which is telescopic by its own. However, since this tube joint only telescopically moves, the movable region is two dimensional, and this tube can not sufficiently cope with the external force due to ground subsidence or earthquake.

To solve such a problem there has been developed a tube joint having three dimensional flexibility by employing the structure for bringing spherical surfaces into contact with each other for sliding movement. However, since the tube joint itself has the telescopic flexibility, when the water pressure test is carried out prior to use or when the tube joint is being transported and moved, various members constituting the joint are moved by vibration. For this reason, it is troublesome to handle the tube joint before the tube joint is connected to the tube, and it is not convenient for actual use.

Thereupon, there has been developed a joint provided with preventing means for preventing the relative movement of cylinders relatively movably connected to each other (e.g., Japanese Patent Application Laid-open No. H8-121665). This joint has structure that a pair of casing tubes constituting the joint are provided at their outer peripheral surfaces with bosses, a rod is provided between the pair of casing tubes, and a long nut having a through hole in its center is fitted into a substantially center portion of the rod in its longitudinal direction. This long nut is formed with a notched portion, and when great external force applied to the joint, this notched portion is broken so that the flexible telescopic characteristics can be exhibited.

However, in this structure, since the long nut used here is provided with the through hole and the rod is threaded into the through hole, there is a possibility that the long nut is not necessarily be constantly located over the longitudinal direction of the joint. That is, two to four rods are disposed around the tube joint and position of each rod is not necessarily constant, and even if the rods are initially located at constant positions, there is a probability that the long nut may move during transportation. Further, locating the rod at constant position itself is troublesome. As a result, when great external force is applied to a tube joint which is buried in the ground, there is a possibility that the long nut is not reliably broken from its notched portion, the timing for exhibit the inherent telescopic flexibility is delayed, and the tube joint itself or the tube is damaged.

Thereupon, it is an object of the present invention to provide a joint which has a great telescopic flexibility so that the drawbacks of the conventional joints can be overcome and the joint can sufficiently cope with the excessive external force applied due to the ground subsidence or earthquake, and which has substantially constant breaking position of the rod so as to reliably maintain the inherent telescopic flexibility, and position of a long nut is not deviated easily during transportation, and which is convenient for handling.

SUMMARY OF THE INVENTION

The above object is achieved by the invention described in claims.

That is, a flexible joint of the present invention comprises: first cylindrical bodies comprising a pair of spherical ring members each formed with a partially spherical outer peripheral surface; a second cylindrical body comprising a sleeve relatively movably inserted in the first cylindrical bodies from an axial direction X of the second cylindrical body; third cylindrical bodies comprising a pair of casing tubes which are fitted around outer peripheral surfaces of the first cylindrical bodies and are provided with mutually slidable spherical inner peripheral surfaces, the casings being formed at their opposite ends with connecting portions, and being provided at their outer peripheral surfaces of large diameter portions with projections having through holes; and rods capable of being inserted into the through holes formed in the outer peripheral surfaces of the large diameter portions, each of the rods being provided and fixed between the projections of the pair of third cylindrical bodies for restricting the telescopic movement of the tube joint, wherein the rods comprise a pair of rods connected to each other in the vicinity of a substantially central portion between the opposed projections, the pair of rods being threadedly connected to at least one of bottomed holes opened and formed on opposite ends of a long nut which is provided at its substantially central portion with a notched portion so that when excessive external force is applied, the notched portion is preferentially broken to restore telescopic flexible effect of the tube joint.

If the flexible joint is structured as described above, the joint can sufficiently cope with excessive external force due to ground subsidence or earthquake, and can move three dimensionally. Further, when the tube joint of the present invention is connected to a pipe such as a water pipe or water pressure test is carried out, or when the telescopic flexible tube joint is transported and moved, various members constituting the joint are not moved by vibration. Therefore, handling before the tube joint is connected to a pipe is facilitated. Further, there is no possibility that the long nut is easily moved during transportation, and it is possible to conveniently determine the position of the long nut by the initial setting. Therefore, when great external force is applied to a tube joint buried under the ground, the long nut is reliably cut from the notched portion, the timing for exhibiting the inherent telescopic flexibility should not be delayed, and the tube joint should not be damaged.

Therefore, according to the tube joint of the present invention, it is possible to realize a joint structure having great telescopic movement range and high flexibility, and the telescopic flexibility range can be increased and the inherent telescopic flexibility can be maintained so that the joint can sufficiently cope with excessive force due to ground subsidence or earthquake, and even when the tube joint is being transported, the assembling structure of the tube joint is not easily varied, and it is possible to provide a tube joint which is convenient for handling.

It is preferable that each of the bottomed holes opened and formed on the opposite ends of the long nut is threaded. With such a structure, the rod and the long nut are connected with each other more strongly and the cutting or breaking position is determined, and the handling is facilitated which is convenient.

It is preferable that a protecting sleeve is fitted over the outside of the long nut. With such a structure, when the telescopic flexible tube joint is transported, it is convenient because the long nut is unintentionally cut from the notched portion.

Further, a flexible joint of the present invention may be structured in the following manner. That is, the first cylindrical bodies are formed at their inner peripheral surfaces with annular peripheral grooves, and are formed at their tip and rear ends with walls which are substantially perpendicular to an axis of the first cylindrical bodies, the second cylindrical body can fit and fix the lock-ring into a recess formed in an outer peripheral surface of the second cylindrical body in the vicinity of its end, and when external force is applied, an end surface of the lock-ring and the walls of the tip and rear ends of the first cylindrical bodies are abutted against each other through their surfaces such as to restrain its movement, and seal means is provided in each of sliding portions between the first cylindrical bodies and the second cylindrical body and between the first cylindrical bodies and the third cylindrical bodies.

With such a structure, since the long nut does not easily come out and the seal means is provided, even when excessive force is applied, it is possible to always secure the water-tight sealing performance, to reliably prevent a water pipe or the like to be connected from being destroyed, and to maintain the inherent joint function between the water pipes.

It is preferable that the annular peripheral groove of the first cylindrical body is formed with a tapered surface whose diameter is reduced toward an end of the large diameter restricting portion in tapering manner. With such a structure, even when great ground subsidence force is applied to move the lock-ring, obstacle during the movement is eliminated, and the lock-ring can reliably be moved to the large diameter restricting portion conveniently.

Further, a flexible joint of the present invention may be structured in the following manner. That is, a telescopic flexible tube joint comprises: first cylindrical bodies each comprising a spherical portion and a straight tube portion, third cylindrical bodies comprising a pair of casing tubes which are fitted around outer peripheral surfaces of the first cylindrical bodies and are provided with mutually slidable spherical inner peripheral surfaces, the casings being formed at their opposite ends with connecting portions, and being provided at their outer peripheral surfaces of large diameter portions with projections having through holes; and rods capable of being inserted into the through holes formed in the outer peripheral surfaces of the large diameter portions, each of the rods being provided and fixed between the projections of the pair of third cylindrical bodies for restricting the telescopic movement of the tube joint, wherein the rods comprise a pair of rods connected to each other in the vicinity of a substantially central portion between the opposed projections, the pair of rods being threadedly connected to at least one of bottomed holes opened and formed on opposite ends of a long nut which is provided at its substantially central portion with a notched portion so that when excessive external force is applied, the notched portion is preferentially broken to restore telescopic flexible effect of the tube joint.

With such a structure, since the inherent telescopic flexibility function can not be exhibited until excessive force is applied, the convenience of handling is further enhanced, the number of parts of the joint structure can be reduced, and the entire producing costs can conveniently be reduced.

Further, a long nut for a flexible joint of the present invention comprises: a substantially cylindrical body formed at its opposite side surfaces with bottomed holes, an inner peripheral surface of at least one of the holes is threaded, and a notched portion formed in substantially central portion of the substantially cylindrical body in its longitudinal direction, wherein rods for restraining telescopic movement of the telescopic flexible tube joint can be inserted into the holes, and the notched portion has is shaped such that the notched portion is broken faster than the rods when external force is applied to the telescopic flexible tube joint in a state in which the long nut is mounted for restraining the telescopic movement of the telescopic flexible tube joint.

If the long nut is structured as described above, the flexible joint to which this long nut is mounted can sufficiently cope with excessive external force due to ground subsidence or earthquake, and can move three dimensionally. Further, when the tube joint of the present invention is connected to a pipe such as a water pipe or water pressure test is carried out, or when the telescopic flexible tube joint is transported and moved, various members constituting the joint are not moved by vibration. Therefore, handling before the tube joint is connected to a pipe is facilitated. Further, there is no possibility that the long nut is easily moved during transportation, and it is possible to conveniently determine the position of the long nut by the initial setting.

Further, it is preferable that the long nut has a cylindrical outward appearance, and an outer diameter of the notched portion of the long nut is smaller than an outer diameter of the rod.

With such a structure, when excessive force is applied to the telescopic flexible tube joint, the long nut is reliably cut or broken from the notched portion irrespective of the outer diameter of the rod, it is convenient because the inherent function of the telescopic flexible tube joint can immediately be exhibited.

DETAILED DESCRIPTION OF THE PREFERRED EMBODIMENTS

An embodiment of a flexible joint of the present invention will be explained in detail with reference to the drawings.

Figure 1:
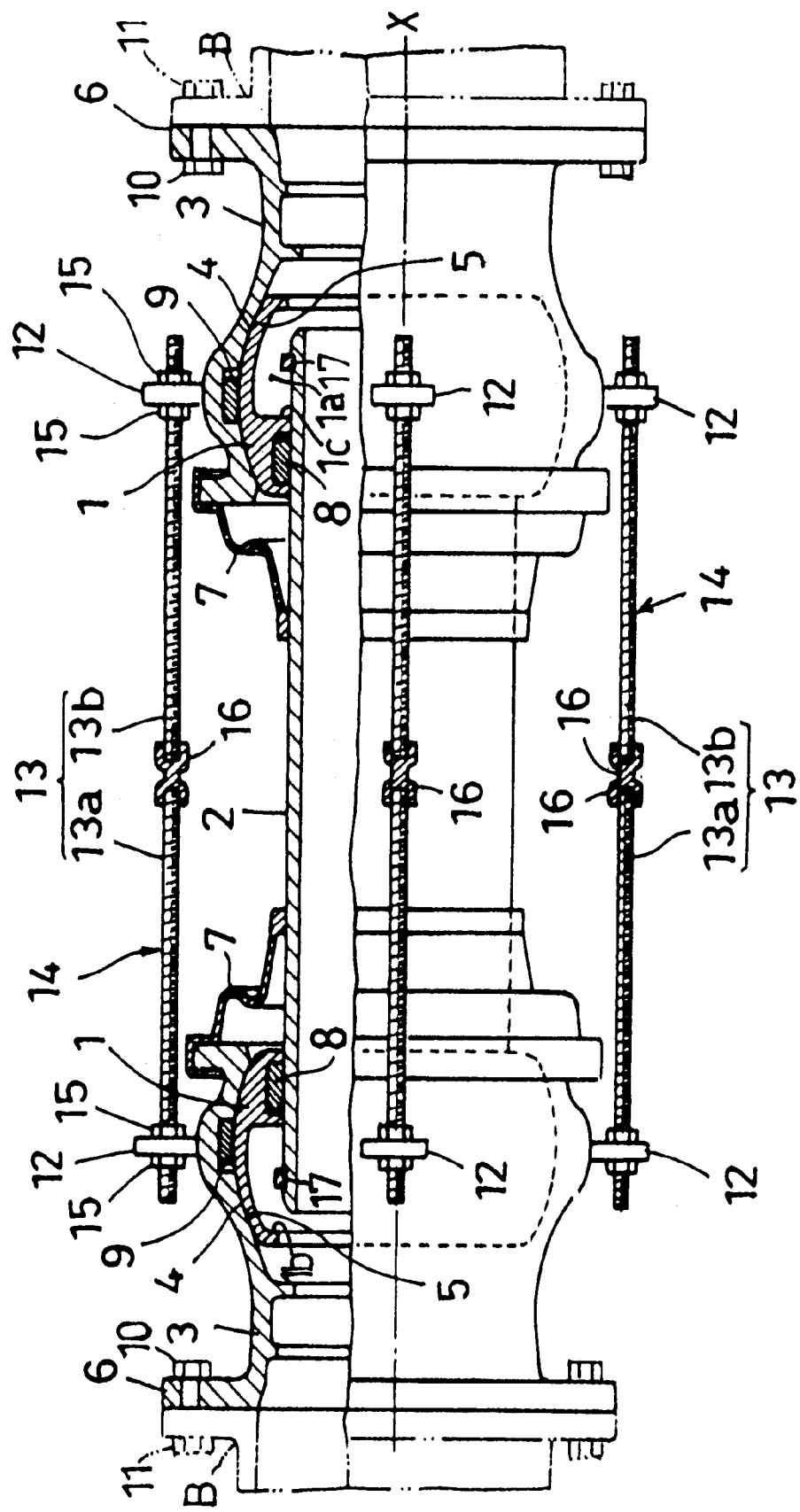
FIG. 1 is a sectional view of a telescopic flexible tube joint according to an embodiment of the present invention.

FIG. 1 shows a sectional structure of a telescopic flexible tube joint A of the present embodiment. This telescopic flexible tube joint A comprises first cylindrical bodies 1, a second cylindrical body 2 and third cylindrical bodies 3. The first cylindrical bodies 1 comprise a pair of cast iron spherical ring members 1, 1 each formed with a partially spherical outer peripheral surface 4. The second cylindrical body 2 comprises a cast iron sleeve 2 which is relatively movably inserted into the first cylindrical bodies 1. The third cylindrical bodies 3 comprise a pair of cast iron casing tubes 3, 3 each including a spherical inner spherical surface 5 which is fitted over the outer peripheral surface 4 of the first cylindrical body 1 and also provided at its outer end with a flange as a connecting portion. Since the telescopic flexible tube joint A is structured in this manner, the sleeve 2, the spherical ring members 1, 1 and two casing tubes 3, 3 are telescopically and relatively swingably connected to one another.

Rubber seal rings 8, 9 as seal means are interposed between the spherical ring members 1, 1, the sleeve 2 and the casing tubes 3, 3. Since the seal rings 8, 9 are interposed, sliding portions of these elements 1 to 3 are water-tightly sealed. Each of the seal rings 8, 9 is subjected to pushing pressure by a projection projecting to a chamber which accommodates the seal ring 8 or 9. This is because the seal rings 8, 9 are not easily come out even if the water pressure in the tubes is increased. It is preferable that each of the seal rings 8, 9 is made of synthetic rubber such as styrene-butadiene rubber.

The casing tube 3 is formed at its outer end with a protrusion 6 to be connected to another tube B. The casing tube 3 is connected to the other tube B by inserting a bolt 10 through a through hole formed in the protrusion 6 and a through hole formed in a protrusion of the other tube B, and by threadedly fastening a nut 11 to the bolt 10. A rubber casing cover 7 is mounted over the sleeve 2 and the casing tube 3 so as to protect the sliding portion of the elements 2 and 3.

Structure of the spherical ring member 1 will be explained. The spherical ring member 1 is formed at its inner peripheral surface with an annular peripheral groove 1a. The inner side of the annular peripheral groove 1a abuts against a stainless steel lock-ring 17 having substantially angle section which is fitted and fixed into a recess made in the outer peripheral surface in the vicinity of the end of the sleeve 2. By this abutment, relative movable range of the spherical ring member 1 and the sleeve 2 in the axial direction is restricted. That is, when the spherical ring member 1 and the sleeve 2 are relatively moved in either right or left direction, the lock-ring 17 fitted into the outer peripheral surface of the sleeve 2 abuts against restricting grooves 1b, 1c provided in left and right ends of the annular peripheral groove 1a formed in the inner peripheral surface of the spherical ring member 1 such as to prevent the spherical ring member 1 and the sleeve 2 from further moving relatively, thereby securing the water-tight sealing performance. Each of the restriction grooves 1b and 1c includes a wall which is substantially perpendicular to the axial direction of the cylindrical body such that the restriction groove can contact with the lock-ring 17 through their surfaces.

The lock-ring 17 is formed into ring-like shape along the outer peripheral surface of the cylindrical sleeve 2, and a portion of the lock-ring 17 is notched or cut and thus is formed into substantially C-shape. The lock-ring 17 is designed such that the lock-ring 17 can be fitted to the outer peripheral surface of the sleeve 2 using a jig (not shown) in a state in which the sleeve 2 is inserted in the spherical ring member 1. It is preferable that the cross section of the lock-ring 17 is rectangular which is slightly longer in the axial direction of the cylindrical body, e.g., height:width= 1:15 to 1:2. More preferably, the rectangular shape as the size of height:width=1:18 to 1:2 because the lock-ring 17 is not come out even if great external force is applied.

Each of the casing tubes 3 is formed with projections 12 having four (eight in total) through holes made in the outer peripheral surface of a large diameter portion of the casing tube 3. A pair of left and right steel rods 13a, 13b formed with external screws which are threaded into internal thread holes of the projections 12 are connected at substantially central portion between the opposed projections 12, 12. The pair of the left and right rods 13a, 13b are threaded and connected to two bottomed internal thread holes 16b formed on opposite ends of the long nut 16 provided at its substantially central portion in its longitudinal direction with notched portions 16a. The pair of left and right rods 13 are provided between four pairs of projections 12, 12. Outer ends portion of each of the rods 13 and the projections 12, 12 are fastened and fixed by two nuts 15, 15.

FIG. 1 shows four rods 13, but the number of rods 13 may be two, three or more, and the number of rods 13 is not specifically limited. The long nut 16 is illustrated as being cylindrically, but it may be polyhedron. In this case, it is convenience for rotate and move the long nut 16 using a jig.

Figure 2:
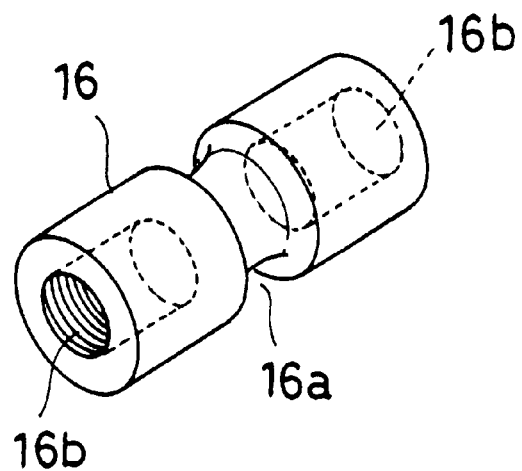
FIG. 2 is a perspective view of a long nut used for the telescopic flexible tube joint shown in FIG. 1.
Figure 3:
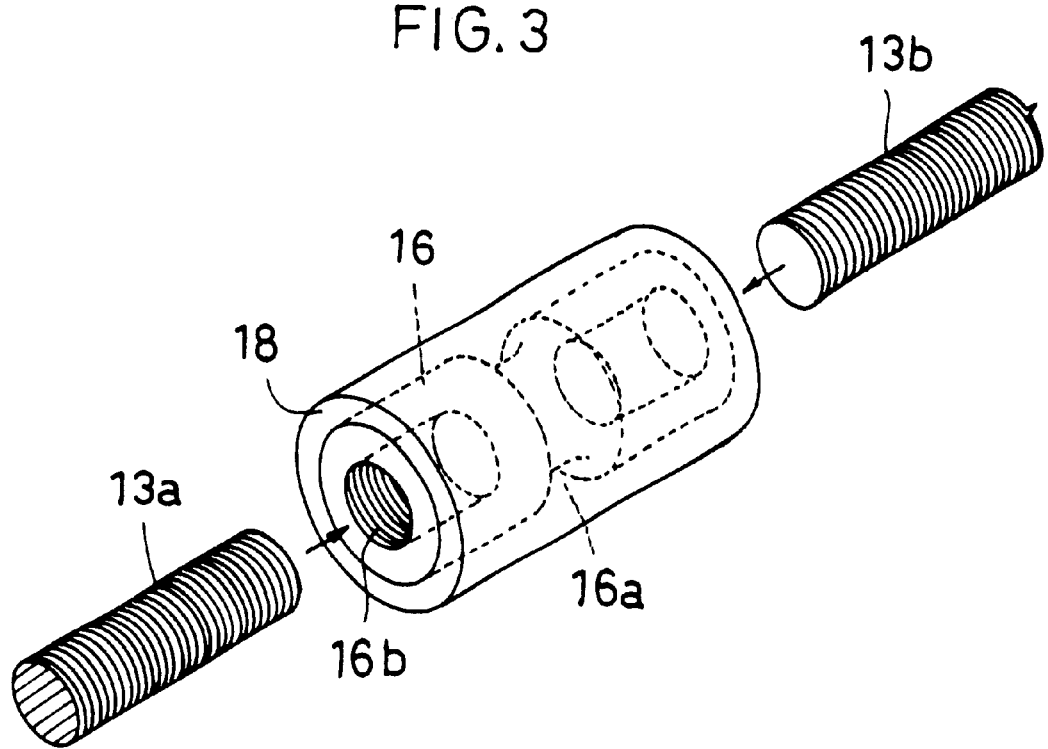
FIG. 3 is an exploded perspective view for explaining how to use the long nut shown in FIG. 2.

The rods 13 restrain the telescopic movement of the telescopic flexible tube joint when the telescopic flexible tube joint is transported or used for water pressure text prior to the actual use. The strength of the long nut 16 is set such that when excessive load such as ground subsidence is applied, the long nut 16 formed at substantially central portion in the longitudinal direction is broken from the notched portion 16a to exhibit the telescopically movable function inherently possessed by the joint. FIG. 2 shows details of the long nut 16, and FIG. 3 shows a state in which the pair of left and right rods 13a, 13b are connected to the long nut 16. FIG. 3 shows a state in which a cylindrical long nut protecting sleeve 18 is fitted over the outer peripheral surface of the long nut 16. When the telescopic flexible tube joint is transported, the protecting sleeve 18 protects the long nut 16 by protecting the latter from being unintentionally cut from the notched portion 16a thereof. It is preferable that the long nut 16, the protecting sleeve 18 and the rod 13a, 13b are made of steel, steel alloy or the like.

Figure 4A:
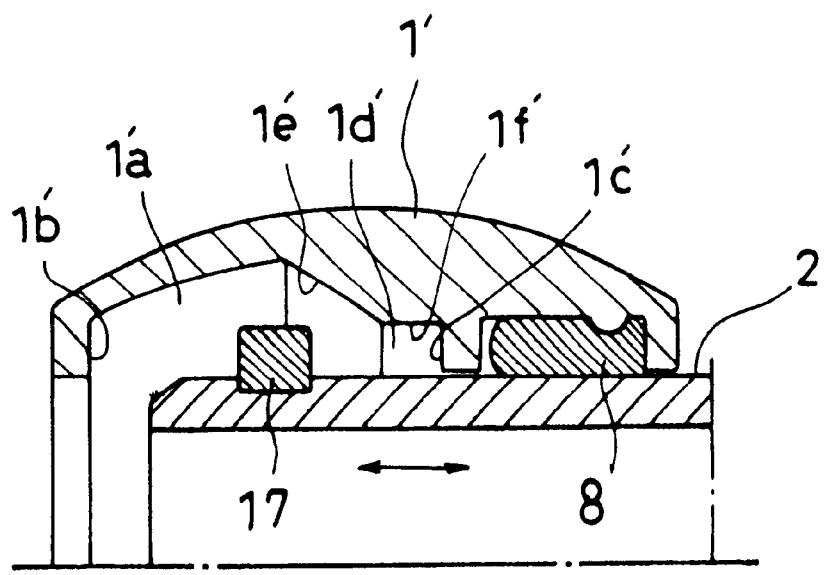
FIGS. 4a and 4b are partial sectional views of the telescopic flexible tube joint shown in FIG. 1.
Figure 4B:
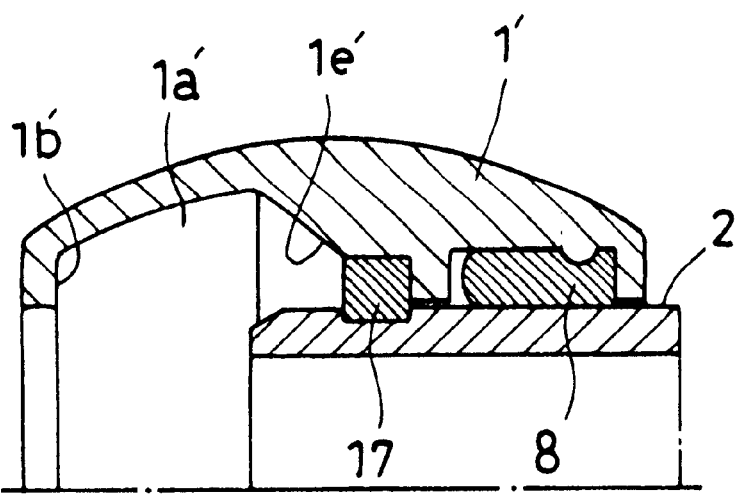

Next, FIGS. 4a and 4b show a modification of a spherical ring member 1'. FIGS. 4a and 4b are partial sectional views of sliding portions of the spherical ring member 1' and the sleeve 2, and show a case in which the external force is applied from position of FIG. 4a, and the spherical ring member 1' and the sleeve 2 relatively move to position shown in FIG. 4b. In FIGS. 4a and 4b, the casing tube is omitted for simplification.

The spherical ring member 1' as a feature in shape of an annular peripheral groove 1'a formed in its inner peripheral surface. That is, when the sleeve 2 is moved from the position of FIG. 4a by the external force to the position shown in FIG. 4b, the lock-ring 17 on the sleeve 2 abuts against an enlarged restricting portion 1'd of the spherical ring member 1'. The enlarged restricting portion 1'd comprises an enlarged restricting surface 1'f along the axial direction X of the cylindrical body of the sleeve 2, and a vertical wall 1'c substantially perpendicular to the enlarged restricting surface 1'f. The locking 17 is just accommodated within the enlarged restricting portion 1'd and is contacted with the vertical wall 1'c through their surfaces. Therefore, even if great external force for pushing the lock-ring 17 toward the position of FIG. 4b is applied to the lock-ring 17, the lock-ring 17 is not easily come out from the sleeve 2.

When the external force is applied so that the lock-ring 17 is relatively moved from the position of FIG. 4a to the direction opposite from the position shown in FIG. 4b, the lock-ring 17 on the sleeve 2 abuts against an end surface 1'b of the spherical ring member 1'. The end surface 1'b is formed such that it is substantially perpendicular to the axial direction X of the cylindrical body of the sleeve 2, and the end surface 1'b contacts with an end surface of the lock-ring 17 through their surfaces. Further, the annular peripheral groove 1'a of the spherical ring member 1' is formed with a tapered surface whose diameter is reduced toward the end of the enlarged restricting portion 1'd in tapering manner so that even when great ground subsidence force is applied and the lock-ring 17 is moved from the position of FIG. 4a to the position shown in FIG. 4b, any obstacle during the transfer is eliminated so that the lock-ring 17 can reliably move to the enlarged restricting portion 1'd.

[Another Embodiments of the Invention]

Figure 5:
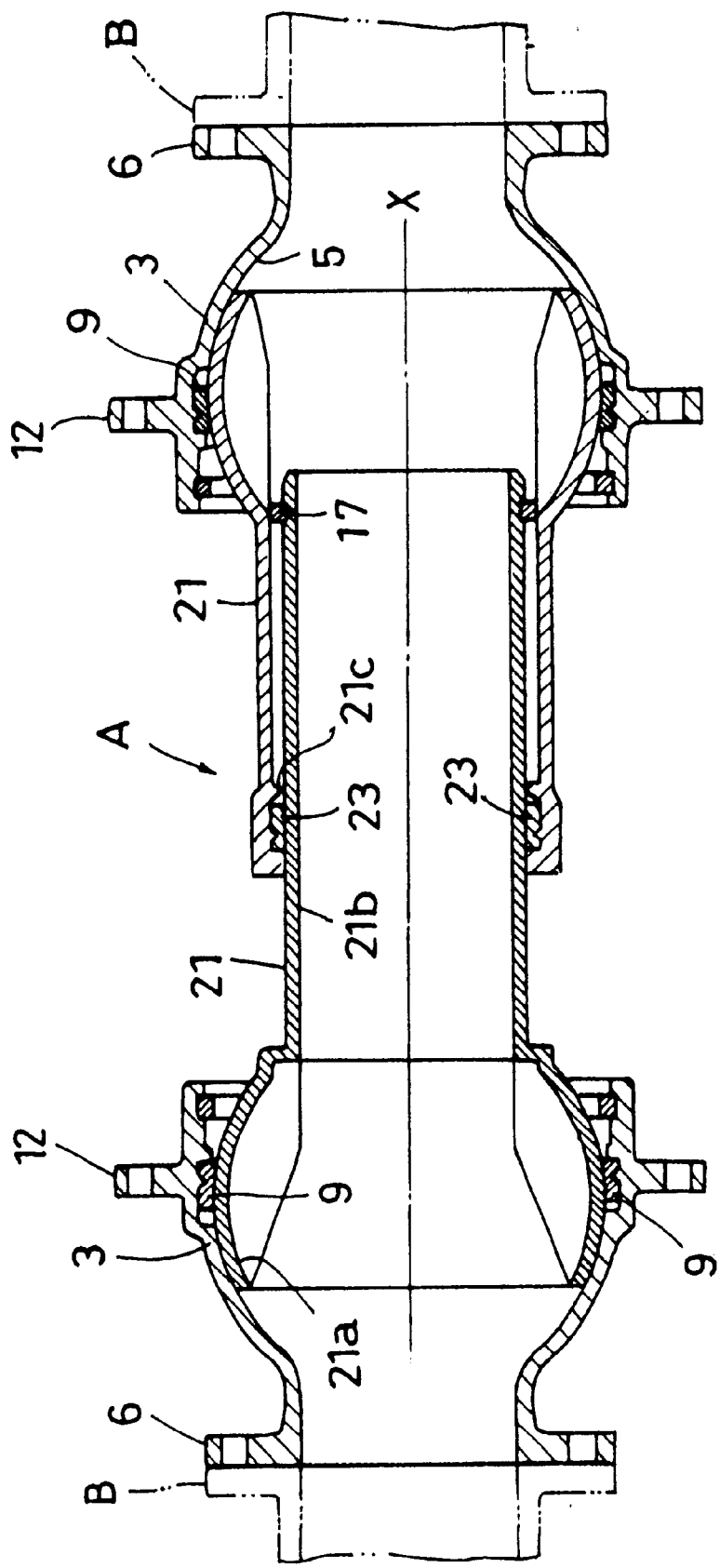
FIG. 5 is a sectional view of a telescopic flexible tube joint according to another embodiment.

(a) FIG. 5 shows a sectional structure of a telescopic flexible tube joint A' according to another embodiment. This tube joint A' comprises first cylindrical bodies 21 and third cylindrical bodies 3. Each of the first cylindrical bodies 21 comprises a spherical portion 21a and a straight tube portion 21b. Each of the third cylindrical bodies 3 has substantially the same shape as that of the previous embodiment. An outer peripheral surface of the spherical portion 21a of the first cylindrical body 21 and an inner peripheral surface 5 of the spherical portion of the third cylindrical body 3 are slidingly contacted with each other. Such a sliding structure between the first cylindrical body 21 and the third cylindrical body 3 is provided on left and right sides on each. The straight tube portions 21b of both the first cylindrical bodies 21 are maintained in water-tightly sealed state by a rubber seal ring 23. As in the example shown in FIG. 1, a plurality of projections 12 are provided on an outer peripheral surface of a large diameter portion of the third cylindrical body 3. The projection 12 is also formed with internal thread hole capable of fixing the rod 13 by the nut 15 inserted through the rod 13. Although the rod 13 and the nut 15 are omitted in FIG. 5, a pair of left and right rods 13a, 13b can be provided between the projections 12 through the long nut 16.

The lock-ring 17 is mounted to the tip end portion of the straight tube portion 21b of one of the first cylindrical bodies 21 (the left cylindrical body in FIG. 5) inserted in the other first cylindrical body 21 (the right cylindrical body in FIG. 5). When the external force is applied and the joint A' is extended in a direction separating both the first cylindrical bodies 21 from each other, the lock-ring 17 abuts against a projection 21c formed on an inner peripheral surface of the straight tube portion 21b of the other first cylindrical body 21 such that both the first cylindrical bodies 21 do not come out, thereby preventing the first cylindrical bodies 21 from coming out. When both the first cylindrical bodies 21 approach each other, a tip end of the straight tube portion 21b of the one first cylindrical body 21 abuts against a rising portion of the spherical portion 21a of the other first cylindrical body 21 so that further movements of the first cylindrical bodies 21 are prevented.

The telescopic flexible tube joint shown in FIG. 5 has a merit that the telescopically movable amount can be made greater than that of the tube joint shown in FIG. 1. The rubber casing cover is omitted from the telescopic flexible tube joint shown in FIG. 5. Members in FIG. 5 similar to those of FIG. 1 are designated by the same reference numbers.

(b) The notched portion of the long nut 16 may not be formed over the outer peripheral surface of the substantially central portion in the longitudinal direction, and may be partially formed. Points is that the strength of the long nut 16 should be set such that the telescopic movement of the telescopic flexible tube joint can be restricted when the entire tube joint is transported or is used for water pressure test prior to the actual use, but the long nut 16 is cut when the excessive external force is applied so as to exhibit the telescopically movable flexibility inherently possessed by the joint.

What is claimed is:

1. A flexible joint comprising:
   first cylindrical bodies comprising a pair of spherical ring members each formed with a partially spherical outer peripheral surface;
   a second cylindrical body comprising a sleeve relatively movablly inserted in said first cylindrical bodies from an axial direction X of said second cylindrical body;
   third cylindrical bodies comprising a pair of casing tubes which are fitted around outer peripheral surfaces of said first cylindrical bodies and are provided with mutually slidable spherical inner peripheral surfaces, said casings being formed at their opposite ends with connecting portions, and being provided at their outer peripheral surfaces of large diameter portions with projections having through holes; and
   rods capable of being inserted into said through holes formed in said outer peripheral surfaces of said large diameter portions, each of said rods being provided and fixe between said projections of said pair of third cylindrical bodies for restricting the telescopic movement of said tube joint, wherein
   said rods comprise a pair of rods connected to each other in the vicinity of a substantially central portion between said opposed projections, said pair of rods being threadedly connected to at least one of bottom holes opened and formed on opposite ends of a long nut which is provided at its substantially central portion with a notched portion so that when excessive external force is applied, said notched portion is preferentially broken to restore telescopic flexible effect of said tube joint, wherein a protecting sleeve is fitted over the outside of said long nut.

2. A flexible joint according to claim 1, wherein each of said bottomed holes opened and formed on said opposite ends of said long nut is threaded.

3. A flexible joint according to claim 2, wherein said first cylindrical bodies are formed at their inner peripheral surfaces with annular peripheral grooves, and are formed at their tip and rear ends with walls which are substantially perpendicular to an axis of said first cylindrical bodies,
   said second cylindrical body can fit and fix said lock-ring into a recess formed in an outer peripheral surface of said second cylindrical body in the vicinity of its end, and when external force is applied, an end surface of said lock-ring and said walls of said tip and rear ends of said first cylindrical bodies are abutted against each other through their surfaces such as to restrain its movement, and
   seal means is provided in each of sliding portions between said first cylindrical bodies and said second cylindrical body and between said first cylindrical bodies and said third cylindrical bodies.

4. A flexible joint according to claim 3, wherein said annular peripheral groove of said first cylindrical body is formed with a tapered surface whose diameter is reduced toward an end of said large diameter restricting portion in tapering manner.

5. A flexible joint comprising:

first cylindrical bodies comprising a spherical portion and a straight tube portion, second cylindrical bodies comprising a pair of casing tubes which are fitted around outer peripheral surfaces of said first cylindrical bodies and are provided with mutually slidable spherical inner peripheral surfaces, said casings being formed at their opposite ends with connecting portions, and being provided at their outer peripheral surfaces of large diameter portions with projections having through holes; and rods capable of being inserted into said through holes formed in said outer peripheral surfaces of said large diameter portions, each of said rods being provided and fixe between said projections of said pair of second cylindrical bodies for restricting the telescopic movement of said tube joint, wherein said rods comprise a pair of rods connected to each other in the vicinity of substantially central portion between said opposed projections, said pair of rods being threadedly connected to at least one of bottomed holes opened and formed on opposite ends of a long nut which is provided at its substantially central portion with a notched portion so that when excessive external force is applied, said notched portion is preferentially broken to restore telescopic flexible effect of said joint, wherein a protecting sleeve is fitted over the outside of said long nut.

6. A flexible joint according to claim 5, wherein each of said bottomed holes opened and formed on said opposite ends of said long nut is threaded.

* * * * *